(12) United States Patent
Kiraly et al.

(10) Patent No.: US 7,577,298 B2
(45) Date of Patent: Aug. 18, 2009

(54) METHOD AND SYSTEM FOR RESPONSE IMAGE FEATURE COLLECTION AND CANDIDATE SUMMIT, SURFACE, AND CORE ESTIMATION

(75) Inventors: Atilla Peter Kiraly, Plainsboro, NJ (US); Carol L. Novak, Newtown, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 851 days.

(21) Appl. No.: 10/869,285

(22) Filed: Jun. 16, 2004

(65) Prior Publication Data

US 2005/0020912 A1      Jan. 27, 2005

Related U.S. Application Data

(60) Provisional application No. 60/480,153, filed on Jun. 20, 2003, provisional application No. 60/480,154, filed on Jun. 20, 2003.

(51) Int. Cl.
*G06K 9/46* (2006.01)

(52) U.S. Cl. .................. 382/203; 382/174; 382/206

(58) Field of Classification Search ............... 33/543, 33/550, 555.1; 345/424; 382/203, 286, 228, 382/174, 206; 700/156
See application file for complete search history.

(56) References Cited

U.S. PATENT DOCUMENTS

| | | | | |
|---|---|---|---|---|
| 3,760,644 | A * | 9/1973 | Jullien-Davin | 74/112 |
| 5,761,334 | A * | 6/1998 | Nakajima et al. | 382/132 |
| 5,920,319 | A * | 7/1999 | Vining et al. | 345/420 |
| 6,592,033 | B2 * | 7/2003 | Jennings et al. | 235/385 |
| 7,133,041 | B2 * | 11/2006 | Kaufman et al. | 345/419 |
| 7,194,117 | B2 * | 3/2007 | Kaufman et al. | 382/128 |

OTHER PUBLICATIONS

Sharghi et al., A Novel Method for Accelerating the Visualisation Process Used in Virtual Colonoscopy,Jul. 25-27, 2001, Fifth International Conference on Information Visualisation, 2001,pp. 167-172.*

Kilday et al., Classifying Mammographic Lesions Using Computerized Image Analysis, Dec. 1993, IEEE Transactions on Medical Imaging, vol. 12, pp. 664-669.*

Smith et al., "American Cancer Society Guidelines for the Early Detection of Cancer: Update of Early Detection Guidelines for Prostrate, Colorectal and Endometrial Cancers", CA Cancer J Clin 2001 51: pp. 38-75.

Pickhardt et al., "Computed tomographic virtual colonscopy to screen for colorectal neoplasia in asymptomatic adults", N. Engl. J Med 2003, Dec. 4 349(23): 2191-200.

Yoshida et al., "Three-Dimensional Computer-Aided Diagnosis Scheme for Detection of colonic polyps", IEEE Transactions on Medical Imaging 2001: 20:1261-74.

(Continued)

*Primary Examiner*—Matthew C Bella
*Assistant Examiner*—Dennis Rosario

(57) ABSTRACT

A method for estimating regions of detected candidates identified in a response image of an object created from a scanned Computerized Tomography image is disclosed. The regions are used to generate features. Voxels proximate to a detection center of the object are sampled. A determination is made as to which of the sampled voxels include a region surrounding the detection center. Features that characterize the region are collected.

9 Claims, 8 Drawing Sheets

OTHER PUBLICATIONS

Gokturk et al., "A statistical 3-D pattern processing method for computer-aided detection of polyps in CT colonography", IEEE Trans. On Medical Imaging, Dec. 2001: 1251-60.

Summers et al., "Automated polyp detection at CT colonography: feasibility assessment in a human population", Radiology 2001, 219:51-9.

Kiss et al., "Computer Aided Diagnosis for CT Colonography via Slope Density Functions" In: Ellis R and Peters T, editors, MICCAI 2003, vol. 2878, pp. 746-753.

Li et al., "Practical automated polyp detection scheme for CT colonography", In: Chakraborty DP and Eckstein MP, editors. SPIE Medical Imaging 2004, Proceedings of SPIE vol. 5372.

Nappi et al., "New high-performance CAD scheme for the detection of polyps in CT colonography". In: Fitzpatrick JM and Sonka M, editors. SPIE Medical Imaging 2004. Proceedings of SPIE vol. 5370.

Waye et al., "Small colon polyps", AM J Gastroenterol, Feb. 1988 83(2): 120-2.

Iordanescu et al., "Automatic colon segmentation in CTCCAD", In: Amini AA and Manduca A, editors. SPIE Medical Imaging 2004. Proceedings of SPIE vol. 5369.

Yee et al., "Colorectal Neoplasia: Performance Characteristics of CT Colonography for Detection in 300 Patients", Radiology 2001 219(3): 685-92.

Acar et al., "Using Optical Flow Fields For Polyp Detection in Virtual Colonoscopy", Medical Imaging Computing and Computer-Assisted Intervention—MICCAI 2001, Utrecht, Netherlands, Oct. 14-17, 2001, LNCS 2208, pp. 637-644.

Jerebko et al., "Computer aided polyp detection in CT colonography using an ensemble of support vector machines", $5^{th}$ Int'l Workshop on Computer-Aided Diagnosis, Jun. 2003.

Paik et al., "Computer aided detection of polyps in CT colonography: method and free-response ROC evaluation of performance", Radiology 2000; 217 (P): 370.

Nappi et al., "Feature-guide analysis for reduction of false positives in CAD of polyps for CT colonography", Medical Physics 2002.

Paik et al., "Evaluation of computer-aided detection in CT colonography: potential application to a screening population", Radiology 2001; 221(P): 332.

* cited by examiner

METHOD AND SYSTEM FOR RESPONSE IMAGE FEATURE COLLECTION AND CANDIDATE SUMMIT, SURFACE, AND CORE ESTIMATION

CROSS REFERENCE TO RELATED APPLICATIONS

This application claims the benefit of U.S. Provisional Application Ser. No. 60/480,153 filed on Jun. 20, 2003, and U.S. Provisional Application No. 60/480,154 filed on Jun. 20, 2003, which are incorporated by reference in their entirety.

FIELD OF THE INVENTION

The present invention is directed to a method and system for collecting features from response images of candidates and furthermore, to a method and system for estimating the summit, core and surface regions of the candidates to discriminate between true and false detections.

BACKGROUND OF THE INVENTION

Computer-Aided Detection (CAD) of colon polyps and lung nodules is an important technology in the early diagnosis of colon cancer and lung cancer. CAD promises to aid physicians in their examination of Virtual Colonoscopy (VC) data for polyps, reducing the possibility of overlooked malignancies. VC is a non-invasive procedure that combines spiral computed tomography or magnetic resonance image data acquisition of an air-filled and cleansed colon with three dimensional imaging software to create virtual endoscopic images of the colonic surface. VC offers a more comfortable screening method for patients, but requires significant time and effort by radiologists to examine large datasets resulting from the high resolution three dimensional images obtained from CT or MR machines. At the same time, these high resolution images offer the potential to detect smaller polyps.

Most Computer Aided Detection (CAD) systems can be divided into four phases: segmentation, candidate generation, feature collection and classification. Identifying polyps using CAD is difficult because the polyps are of various shapes and sizes, and because thickening folds and retained stool may mimic their shape and density. In order to detect candidate polyps, some detection techniques create a "response image" that indicates the likelihood that each point in the volume or on the colon surface is a polyp. In current CAD methods, many false-positive polyp candidates are detected in early stages of the algorithm that must be eliminated in later stages via discriminating features. Most methods make use of features collected from the original CT data.

In current CAD methods, false positives that are created by the initial stages of an algorithm may be eliminated in later stages by collecting and analyzing specific features of each polyp candidate. In order to collect these features, some notion of the space occupied by the candidate must be utilized.

A point location alone, such as the detection point, will only permit a limited number of features to be collected. Some kind of estimate of the volume occupied by a colon polyp or lung nodule must exist to properly collect additional features. Typically, a large number of candidates are detected in the early phases of detection. Any feature collection method must operate quickly to process these candidates.

SUMMARY OF THE INVENTION

The present invention is directed at using either a response image or an original image towards defining a sub-set of the volume associated with a detected candidate. These subsets include the summit, core or surface of the candidate. These subsets can then be used to define regions around a candidate abnormality from which features may be collected in order to distinguish true from false candidates.

One embodiment of the present invention is directed to a method for collecting features from a response image. This image, which is the by-product of candidate detection, can be used to collect discriminating features directly. A detection center for the candidate is identified. The value of the response image at that center is measured. Rays are cast spherically outward from the detection center of the candidate until they reach a specified stopping point. The points encompassed by these rays define a region known as the "summit". The summit region may be analyzed to determine its features including shape measures such as eccentricity.

The present invention is also directed to a method for estimating a core of a candidate abnormality contained in a scanned image of an object. A detection center of a potential candidate is identified. Rays are cast outward for the detection center in a spherical formation. Stopping criteria for each of the rays is defined. A core volume is determined using these rays.

The present invention is also directed to a method for estimating the surface of a candidate abnormality contained in a scanned image of an object. The intersection of those points that contributed the most to the response image at the candidate location and the points at or near the surface define this region. This region is referred to as the voting surface.

BRIEF DESCRIPTION OF THE DRAWINGS

Preferred embodiments of the present invention will be described below in more detail, wherein like reference numerals indicate like elements, with reference to the accompanying drawings.

DETAILED DESCRIPTION

Figure 1:
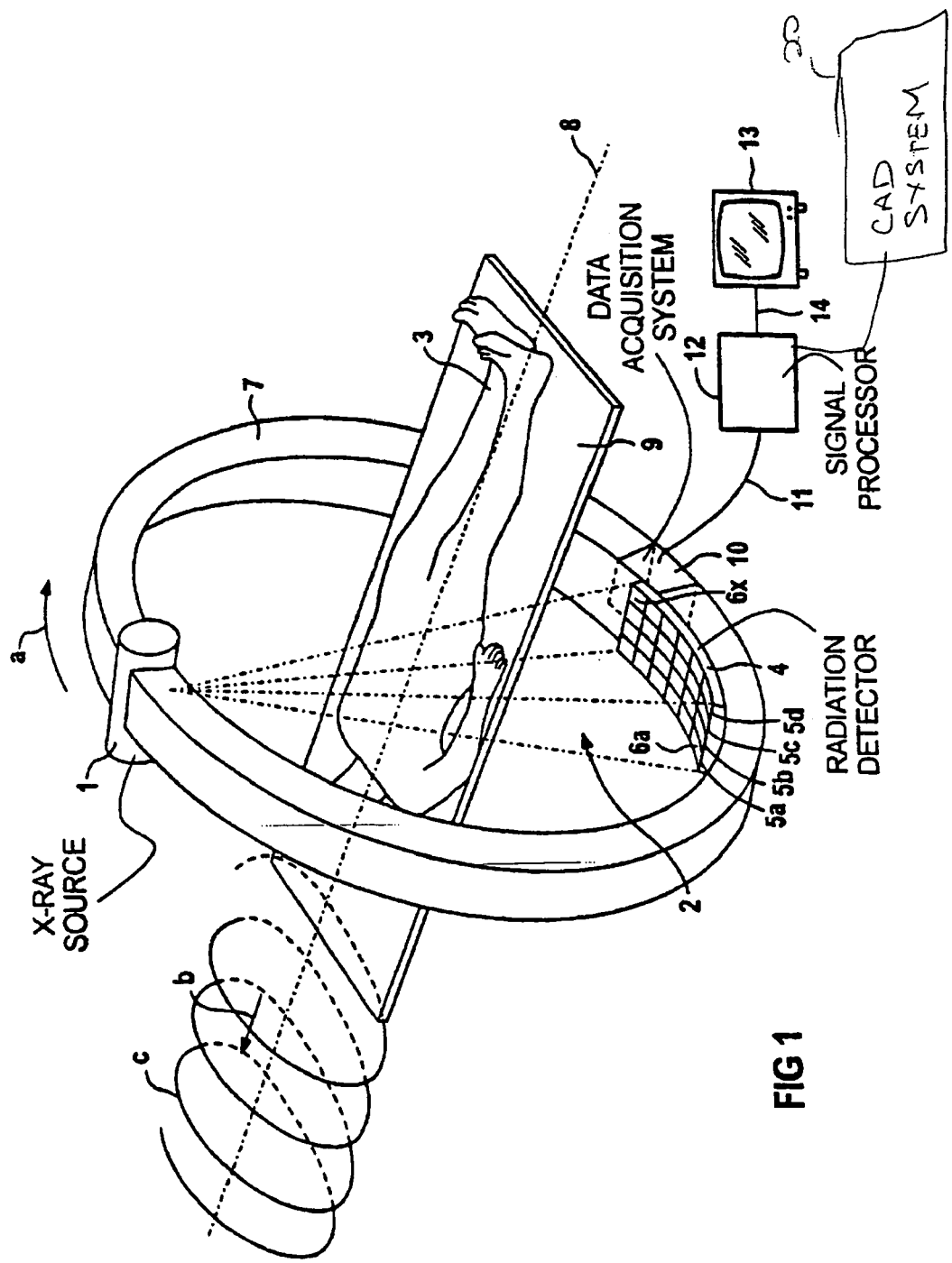
FIG. 1 is a schematic diagram of an exemplary Computed Tomography (CT) system in accordance with the present invention.

The present invention is directed to the use of collecting features for candidate discrimination, such as polyp discrimination or lung nodule discrimination, based upon the response image of a nodule-detection scheme. FIG. 1 schematically depicts an exemplary Computed Tomography (CT) system in accordance with the present invention. The CT system in conjunction with a Computed Aided Detection (CAD) system can be used to perform a non-invasive procedure on a patient to screen for various medical conditions. Examples of such procedures are virtual colonoscopies or chest screenings for the presence of cancerous tissue.

The CT system is equipped with an X-ray source 1, emitting a pyramidal X-ray beam 2, whose marginal rays are represented by the dot-dashed lines in FIG. 1 that penetrates an object 3 to be examined, for example, a patient, and that is incident on a radiation detector 4. In the exemplary embodiment, the radiation detector 4 has four linear detector arrays, 5a through 5d, adjacent to one another, with several detector elements, 6a through 6x, aligned adjacent to one another.

The X-ray source 1 and the radiation detector 4 are, in the exemplary embodiment, mounted opposite to one another on an annular gantry 7. The gantry 7 is mounted on a mounting fixture that is not shown in FIG. 1 such that it may be rotated (cf. arrow a) along the system axis 8 using a supporting mechanism that is not shown in FIG. 1.

The X-ray source 1 and the radiation detector 4 thus form a metrological system that can be rotated around the system axis 8 and displaced along the system axis 8 relative to the patient 3 so that the patient 3 can be X-rayed at various projection angles relative to said system axis 8 and at various positions along the system axis 8. The resultant output signals of the individual detector elements, 6a through 6x, are read out by a data-acquisition system 10 mounted on said gantry 7. The data-acquisition system 10 forms difference signals from adjacent detector elements 6a through 6x. The signals are sent to a signal processor 12 that computes an image of the patient 3 that, in turn, can be displayed on a monitor 13, by means of an electrical cable 11 that incorporates a slip-ring system, or a wireless transmission link in a manner that has not been illustrated. In the exemplary embodiment, the monitor 13 is connected to the signal processor 12 by an electrical cable 14. The computed tomography (CT) system depicted in FIG. 1 can be employed for performing either sequential scans or spiral scans.

In the case of sequential scans, scanning of the patient 3 takes place in slices. The X-ray source 1 and the radiation detector 4 are rotated around the patient 3 relative to the system axis 8, and the measurement system formed by the X-ray source 1 and the radiation detector 4 records numerous projections in order to scan two-dimensional slices of the patient 3. Sectional views representing the scanned slices are reconstructed from the resultant measurement data. The patient 3 is in each case moved along the system axis 8 between scans of consecutive slices. This procedure is repeated until all slices of interest have been scanned.

During spiral scans, the measurement system formed by the X-ray source 1 and the radiation detector 4 is rotated around the system axis 8, and the table 9 is continuously moved in the direction of the arrow b, i.e., the measurement system is continuously moved along a spiral path c relative to the patient 3 until such time as the entire portion of the patient 3 that is of interest has been scanned, thereby generating a dataset representing a volume. The signal processor 12 computes planar data from which, as in the case of sequential scanning, sectional views may be reconstructed from the volume data record by employing an interpolation method.

The images scanned by the CT system and computed by the signal processor 12 are transmitted to a Computer-Aided Detection (CAD) system 20 for further processing. The CAD system 20 applies a filter to the image to obtain a response image. This is then used to generate candidates. Features are then collected from the candidates and used to classify them as true or false positives. Only the true positives are presented to the physician.

There are a variety of methods for creating a response image for polyp detection. In the case of Computed Tomography Colonoscopy (CTC) or Virtual Colonoscopy (VC), several known methods can be employed. In some known methods, the response image is a volume defined by the probability of a voxel being part of a polyp. In another known method, the response image is comprised of a mesh surface of the colon labeled by a curvature measure where locations within the mesh with curvature values in a certain range indicate a high likelihood of the location being a polyp. Hence, the structure of the response image can differ depending upon the method used to generate it.

Figure 2:
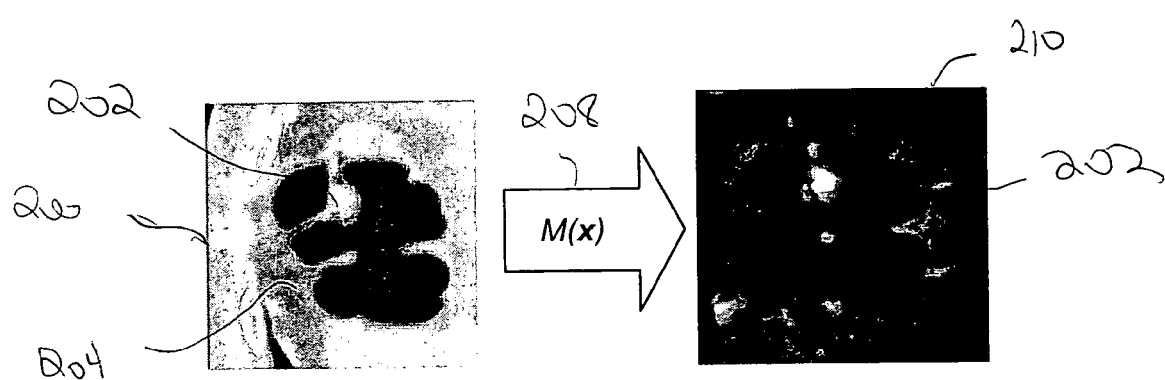
FIG. 2 illustrates a section of a colon and a method for creating a response image in accordance with the present invention.

FIG. 2 illustrates a section of a colon and an exemplary method for creating a response image. A portion of the colon 204 is shown in an original image 200 along with its response image 210. The response image 210 is computed using a MARs (Magnitude-Angle-Radius) filter 208 as described in co-pending provisional patent application No. 60/535,088, filed Jan. 8, 2004 and entitled "A Multi-purpose Filter for Medical Imaging Processing" which is incorporated by reference. The original image 200 (shown on the left) includes a section of a colon 204 that has a polyp 202. A filter is computed at each location of the image and results are shown on the right in response image 210. Although the purpose of the response image 210 is to collect candidates, it can be used to collect features as well.

Various methods can be employed to obtain features from the response image. One method defines a region known as the "summit" around the candidate by sampling the response value at a detection center of a response image and assuming that the value is locally maximal. Next, rays are cast from the detection center outward until they reach some predefined fraction of the center value. The result is a region around the detection center where the response image has a local peak.

In the case where the response image is computed from a surface mesh, the result is a region within that mesh where the values, such as curvature or curvedness for example, are a fraction of the locally maximum value. In the case where the response image is a 3D volume, the result is a 3D region. The output may be given as a list of voxels or points within the "summit" or a binarized sub-volume where voxels within the summit have a value of 1 and all voxels outside the summit have a value of 0.

Figure 3A:
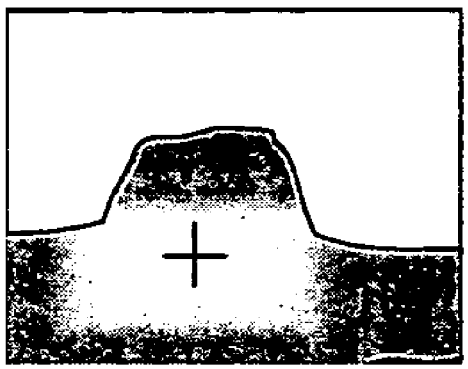
FIGS. 3a and 3b illustrate a method for summit determination in accordance with the present invention.
Figure 3B:
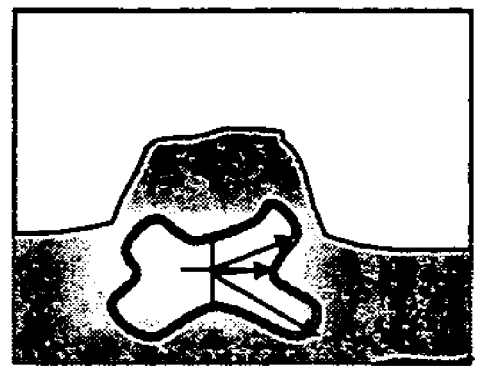

Once this summit about the detection center is defined, any measurements of this aggregate of voxels can proceed. For example, the shape of the summit may be analyzed by computing a type of eccentricity measure. This measure can be performed by comparing the maximal radius of the center of the detection to the average of the radii about this center as shown in FIGS. 3a and 3b. These two values can be divided to give an eccentricity measure. Example radii measurements are shown in FIG. 3b. A perfect sphere will have a ratio of 1.0 since the maximal radius is equal to the average radius. An ellipse will have a ratio lower than 1, with more elongated ellipses having smaller ratios. In general, the fraction of the maximal radius over the average diameter provides good discrimination features as colon polyps or lung nodules tend to be spherical, whereas colonic ridges or pulmonary vessels tend to be elongated.

The gray level response image is used to define the extent of the summit. FIG. 3b shows the response image with rays projected from the center of a detection. These rays stop at a point where the gray level is a fraction of the value obtained at the center. This provides a definition of the voxels from which measurements, i.e., features, can be taken. Similarly, in the case of a mesh response image, rays following the surface projected from the center of the detection outwards stop at vertices that have a fraction of the original response value. In this type of response image, the defined summit will only contain surface points.

Figure 4:
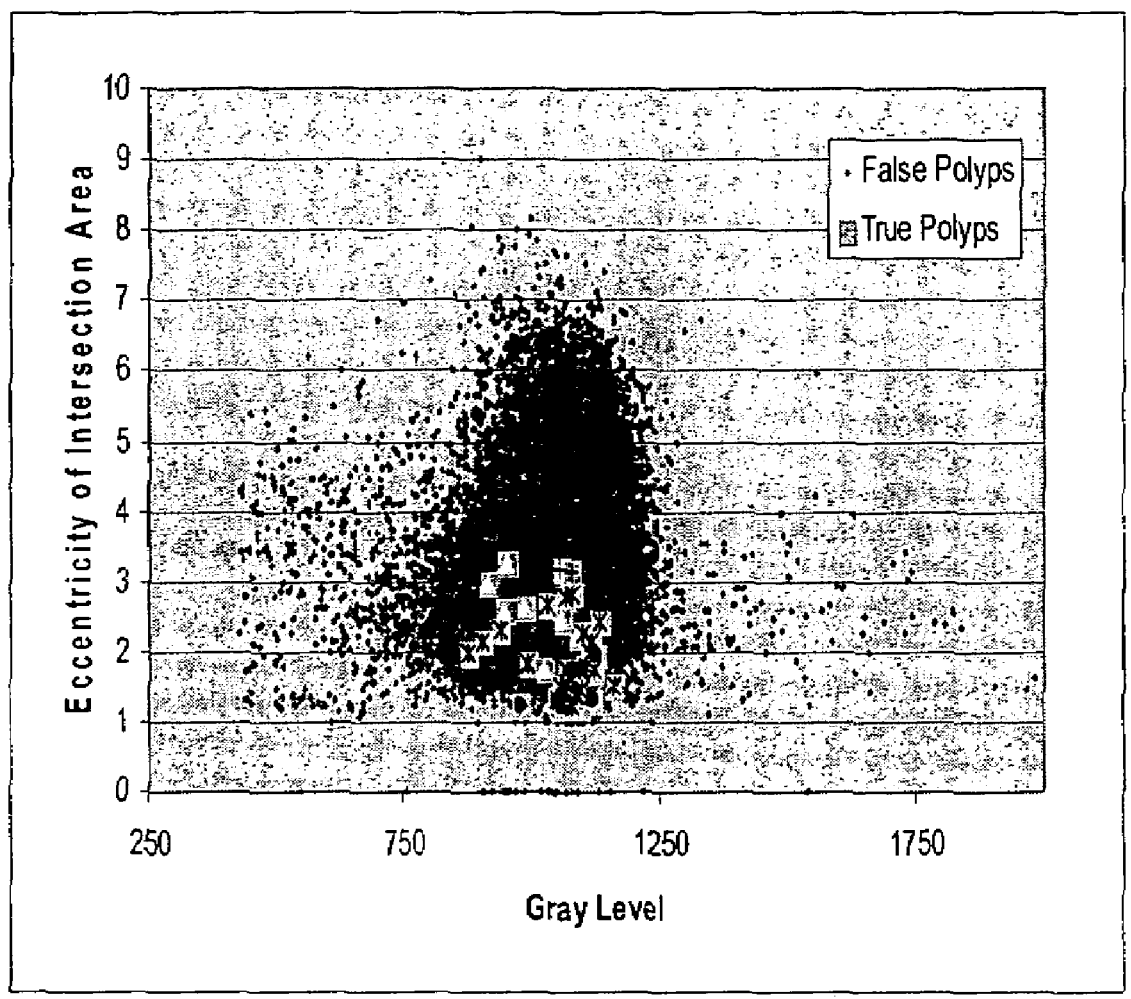
FIG. 4 illustrates a plot of the features of eccentricity of the summit versus the gray level of the center in accordance with the present invention.

An example of the discrimination ability of this measure is shown in FIG. 4. FIG. 4 illustrates a plot of the features of eccentricity of the detection summit versus the gray level of the center for 30 colon datasets. The eccentricity feature obtained from the response image demonstrates good discrimination capability. As can be seen from the plot, the true polyps are grouped together in the most concentrated area of the plot.

Once a polyp candidate has been selected from the response image, in accordance with the present invention a method is described for quickly obtaining estimates of polyp or nodule volumes, along with variations that provide additional utility. The present invention employs a ray casting method for automatically providing an estimate of the volume extent occupied by a selected colon polyp candidate. This defined sub-volume provides additional locations for feature sampling. The estimation method is fast enough to process over 500 detections in a timely fashion. In addition to feature detection, the present invention can be used for marking the site for later examination and size estimation.

Figure 5:
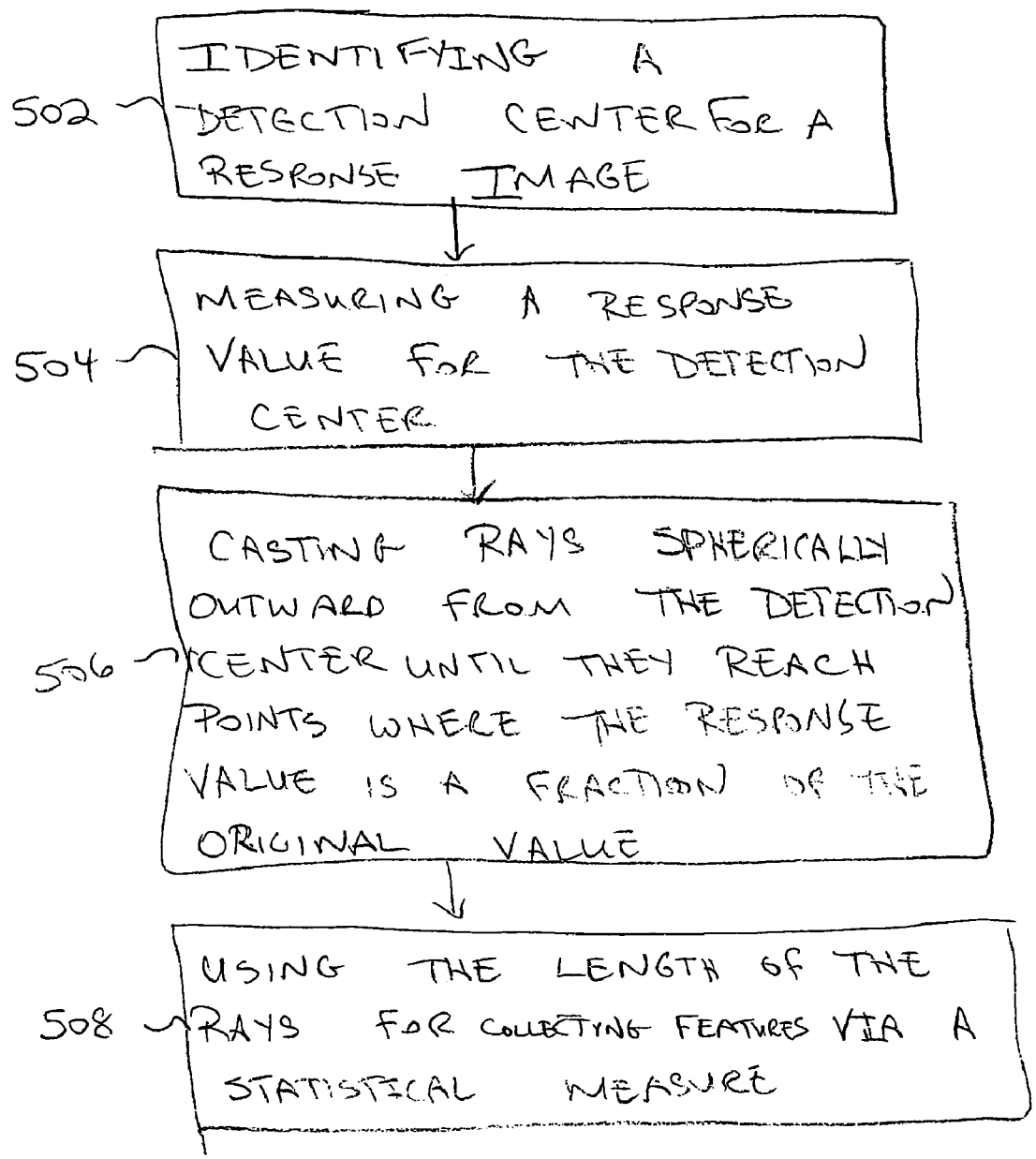
FIG. 5 illustrates a flow chart that sets forth the method of analyzing the response image and collecting features in accordance with the present invention.

FIG. 5 illustrates a flow chart that sets forth an exemplary method of analyzing the response image and computing estimates of the summit in accordance with the present invention. In this example, an eccentricity measurement of the summit is described and illustrated in FIG. 3b. A detection center 1002 for a response image 1000 is identified (step 502) and a response value for the response image is measured (step 504). Rays 1006 are then cast spherically outward until they reach points where the response value is a fraction of the original value (step 506). The lengths of these rays 1006 can then be used directly for collecting features via a statistical measure (step 508). Again, the above example is for the case of a 3D response image. For example, an eccentricity measurement can be formed by taking the ratio of the maximum to the minimum ray lengths. Other measurements that may provide useful features include the sphericity of the summit and the size (diameter or volume).

In CAD systems, detections of possible disease areas are usually reported with the locations of their centers. When volume estimation or segmentation is not provided directly by the detection method, it is still possible to obtain volume estimation or segmentation through the following methods for core estimation. A simple method is first described followed by more complex versions to provide more accurate estimations.

The rays are referred to as "inverse" light since they pass through the solid regions of the image, but stop at air and other less dense structures. This sphere can be modified to an ellipse for anisotropic data if needed. Each ray of inverse light has the property that it passes through tissue, but stops at air. Rays that have the shortest stopping distance are assumed to be hitting the polyp or nodule surface.

Figure 6:
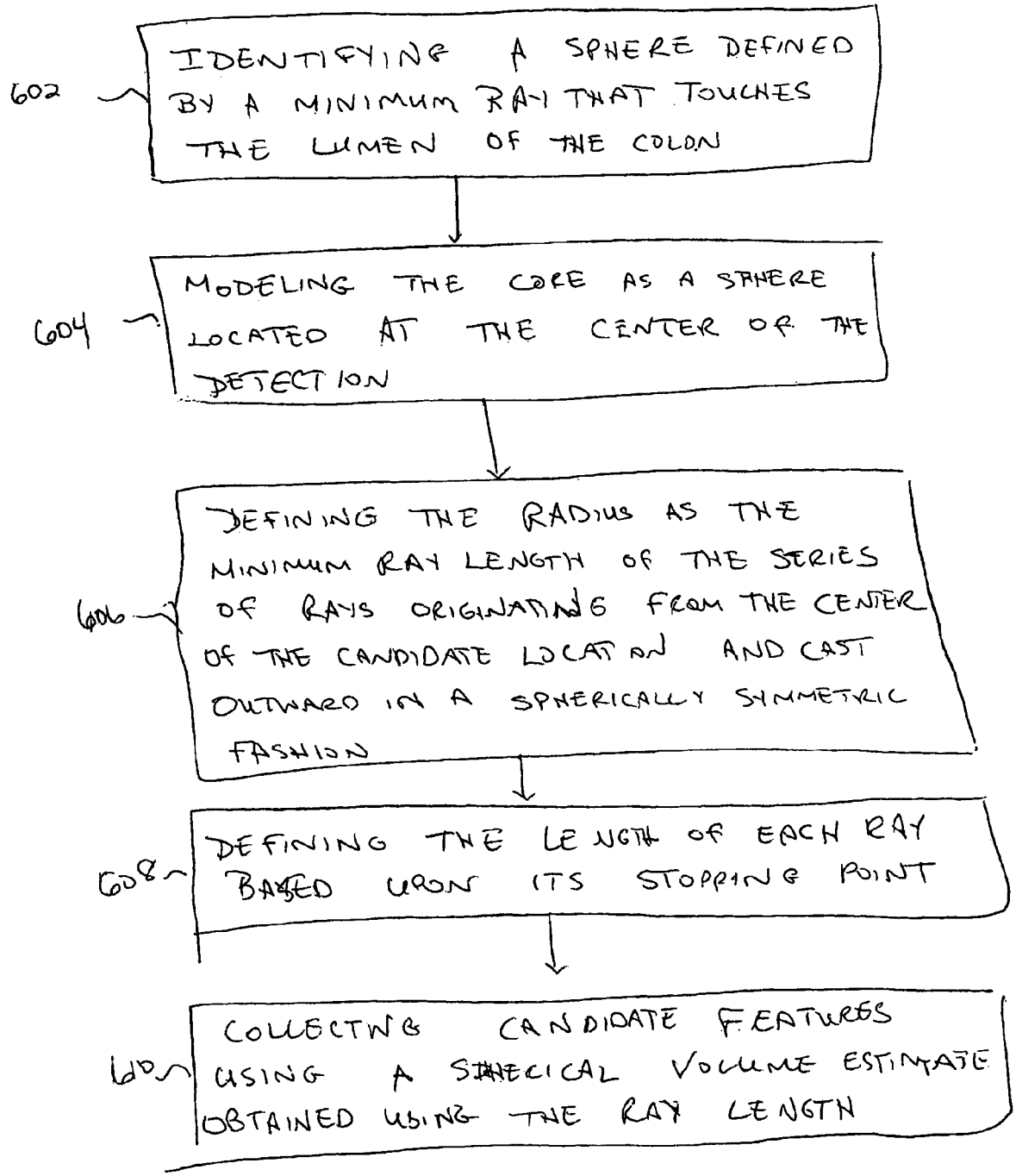
FIG. 6 illustrates a flow chart that sets forth a method for identifying and collecting candidate core and surface estimates in accordance with the present invention.
Figure 7:
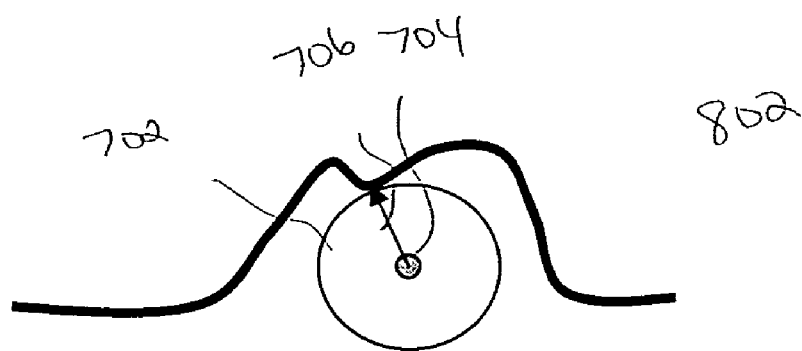
FIG. 7 illustrates a spherical core estimation for sampling based on a minimum ray length in accordance with the present invention.

A simple example for estimating the core for a candidate will now be described with reference to FIGS. 6 and 7. Whereas the summit of the candidate is computed from the response image, the core is computed from the original image data. FIG. 6 illustrates a flow chart that sets forth a method for estimating the core for a candidate in accordance with the present invention. Given the location of the center of detection, rays of "inverse" light are cast outwards in a sphere formation. FIG. 7 illustrates a simple conservative estimation of the core of the candidate 702 in accordance with the present invention. The simple core estimation method involves taking a sphere defined by a minimum ray that touches the lumen (step 602). The core is modeled as a sphere 702 located at the center of the detection 704 (step 604). The final detail is the radius of the sphere. The radius is defined as the minimum ray length of the series of rays 706 originating from the center 704 of the candidate location and cast outward in a spherically symmetric fashion (step 606). Each ray continues until it hits the lumen.

Figure 8:
FIG. 8 illustrates a 3D CT image of a colon polyp to which the method of the present invention is applied.

This stopping point defines the length of the ray (step 608). Given this spherical volume estimate, various features can be collected within it to help discriminate between true and false polyps (step 610). Varying the stopping criteria for the rays and allowing for non-spherical shapes based on the rays may offer better accuracy in the core volume estimation. An example of the method of the present invention applied to a colon polyp 802 obtained from a 3D CT image is shown in FIG. 8.

Two more complex variations involve allowing variable ray length as well as confidence labeled sub-volumes. Variable ray lengths require additional stopping criteria to prevent the ray from creating an over-estimation. The stopping criteria can be any number of rules. For example, analyzing changes in the gradient of the image along with the original air threshold provides more stringent criteria. In addition, rays can be limited by neighboring rays in a form of a spring-connected model. A confidence-labeled ray can create a grayscale estimation with a degree of confidence stored in the gray levels. The confidence value can then weight the features gathered. In this case, continuous function stopping criteria would be employed.

Concerning stopping criteria, some of the stopping points for the rays can be more precisely determined by use of a voting surface. The surface of the candidate can be estimated by use of the response image. Each voxel in the response image has a score related to the likelihood of a candidate existing at that location. Only those voxels or regions having larger scores are used as candidates. The surface of the candidate can be estimated by taking the intersection of the surface or near surface voxels with those that contributed substantially to the response around the candidate. This surface is referred to as the voting surface since it is those voxels or points that "voted" for the candidate.

The method for voting surface estimation is determined by the computer detection method. Generally speaking, a response image is computed by considering a local neighborhood around each potential candidate and computing some function of this neighborhood wherein values are summed to produce a likelihood that the point is a candidate. Within this local neighborhood, a subset of voxels within the neighborhood will contribute non-zero values to the overall sum. A voting surface is defined as the particular surface points that contributed a non-zero value to the detection at the given candidate. Alternatively a threshold T above zero may be chosen, and only that subset which contributed a value above T is considered. Once the voting surface has been computed, it directly provides stopping points for rays.

Figure 9A:
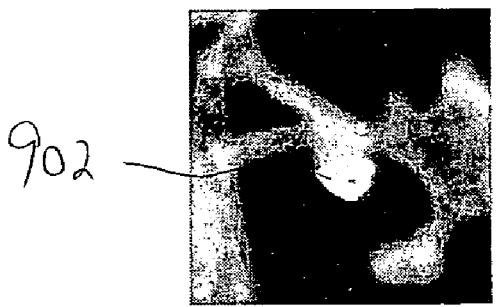
FIGS. 9a and 9b illustrate examples of voting surfaces associated with colon polyps in accordance with the present invention.
Figure 9B:

Additionally, the voting surfaces can be directly used for feature collection as illustrated in FIGS. 9a and 9b. FIG. 9a shows an example of a segmented voting surface 902 for a 3D CT colon image. In this instance, the voting surface of the candidate defines the set of voxels from which features are collected. Rather than providing stopping points for ray casting when sampling the core of the candidate, this embodiment provides a means to sample the surface voxels of the candidate.

FIGS. 9a and 9b demonstrate a polyp with the voting surface defined. The voting surface may be limited in extent. An extended voting surface 904, 906, shown in FIG. 9b, can be used to extend the voting surface to cover more of the polyp or nodule. In this image, the voting surface is used as seed points for hysteresis thresholding into the neighboring surface of the response image. This result has the same applications as the voting surface.

These methods can also be applied to polyp size estimations. The subset of the rays approaching the surface in the core estimation can be used for a radius estimation of the polyp. In addition to being a feature for classifying true and false detections, the size estimate can then be used in the report to the physician, or as an input parameter for merging nearby detections, or as a method to "score" CAD detections by comparing them against ground truth locations marked by a physician.

The present invention provides several approaches to quickly create sampling locations for collecting features of polyp candidates. The methods presented estimate a volume occupied by the candidate. Again, this volume can be the summit, the core, or the voting surface of the candidate. Additionally, the volume may be defined absolutely in a binary sense, or partially with confidence values assigned to each voxel to signify the likelihood of that particular voxel belonging to the candidate. This volume estimation provides a region on which to compute additional features of the candidate. The resulting speed of computation is fast enough to handle over 500 suspect sites in a single image.

Having described embodiments for a method for analyzing response images to identify initial candidates and to collect candidate features to help distinguish true polyps from false detections, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

We claim:

1. A method for estimating regions comprising the steps of:
   a processor detecting potential candidates identified in a response image created from a three-dimensional medical image of an object and using such regions to generate features for candidate discrimination,
   sampling voxels surrounding a detection center of the potential candidate region by performing the following steps:
   i). identifying the detection center for the potential candidate region;
   ii) measuring a response value for the potential candidate region;
   iii). casting rays spherically outward from the detection center of the potential candidate region, the casted rays extending until each casted ray reaches a point where the response value is a fraction of its original value;
   iv). measuring the lengths of the casted rays; and
   v). using the rays to define the potential candidate region associated with the detection center;
   determining which of the sampled voxels comprise the potential candidate region;
   collecting features that characterize the potential candidate region;
   calculating an eccentricity measurement by performing the following steps:
   i). projecting rays from the detection center;
   ii). determining a stopping point for each projected ray;
   iii). identifying a ray having a maximal radius;
   iv). calculating the average radius;
   v). calculating an eccentricity measurement by comparing the maximal radius to the average radius of the detection center; and
   analyzing the features to automatically determine the likelihood of an abnormality being present in the potential candidate region.

2. The method of claim 1 wherein the object is a colon.

3. The method of claim 2 wherein the potential candidate region is a potential polyp.

4. The method of claim 3 wherein the collected features are used to determine if the potential polyp is a true polyp.

5. The method of claim 1 wherein the object is a lung.

6. The method of claim 5 wherein the potential candidate region is a potential lung nodule.

7. The method of claim 6 wherein the collected features are used to determine if the potential lung nodule is a true nodule.

8. The method of claim 1, wherein the method further comprises the steps of:
   identifying a detection center of a potential candidate;
   further determining the subset of points that are on or near the surface of the object.

9. The method of claim 8 wherein the surface is defined as the intersection of points on or near the surface and those points that contributed substantially to response value of the potential candidate in terms of an additive value beyond a set threshold.

* * * * *